(12) United States Patent
Rodriguez-Serrano et al.

(10) Patent No.: US 9,158,995 B2
(45) Date of Patent: Oct. 13, 2015

(54) DATA DRIVEN LOCALIZATION USING TASK-DEPENDENT REPRESENTATIONS

(71) Applicant: Xerox Corporation, Norwalk, CT (US)

(72) Inventors: Jose Antonio Rodriguez-Serrano, Grenoble (FR); Diane Larlus-Larrondo, La Tronche (FR)

(73) Assignee: XEROX CORPORATION, Norwalk, CT (US)

( * ) Notice: Subject to any disclaimer, the term of this patent is extended or adjusted under 35 U.S.C. 154(b) by 281 days.

(21) Appl. No.: 13/803,334

(22) Filed: Mar. 14, 2013

(65) Prior Publication Data
US 2014/0270350 A1    Sep. 18, 2014

(51) Int. Cl.
G06T 7/00 (2006.01)
G06T 7/20 (2006.01)
G06K 9/62 (2006.01)
G06K 9/32 (2006.01)

(52) U.S. Cl.
CPC .............. *G06K 9/6217* (2013.01); *G06K 9/325* (2013.01); *G06K 9/3233* (2013.01); *G06K 9/6267* (2013.01); *G06T 7/0081* (2013.01); *G06K 2209/15* (2013.01); *G06T 7/2033* (2013.01)

(58) Field of Classification Search
CPC .............. G06K 9/4671; G06K 9/3233; G06K 2209/15; G06K 9/626; G06T 7/0081; G06T 7/2033
USPC ........................................................ 382/105
See application file for complete search history.

(56) References Cited

U.S. PATENT DOCUMENTS

| | | | | |
|---|---|---|---|---|
| 8,111,923 | B2* | 2/2012 | Csurka et al. | 382/190 |
| 8,577,182 | B1* | 11/2013 | Goldman | 382/298 |
| 8,660,351 | B2* | 2/2014 | Tang | 382/173 |
| 8,675,966 | B2* | 3/2014 | Tang | 382/195 |
| 2007/0005356 | A1* | 1/2007 | Perronnin | 704/245 |
| 2007/0258648 | A1* | 11/2007 | Perronnin | 382/224 |
| 2008/0069456 | A1* | 3/2008 | Perronnin | 382/228 |
| 2010/0040285 | A1 | 2/2010 | Csurka et al. | |
| 2010/0226564 | A1* | 9/2010 | Marchesotti et al. | 382/159 |
| 2012/0045134 | A1* | 2/2012 | Perronnin et al. | 382/197 |
| 2012/0076401 | A1 | 3/2012 | Sanchez et al. | |
| 2012/0106781 | A1 | 5/2012 | Kozitsky et al. | |
| 2012/0143853 | A1 | 6/2012 | Gordo et al. | |

(Continued)

OTHER PUBLICATIONS

U.S. Appl. No. 13/351,038, filed Jan. 16, 2012, Rodriguez-Serrano.

(Continued)

*Primary Examiner* — Utpal Shah
(74) *Attorney, Agent, or Firm* — Fay Sharpe LLP (57) ABSTRACT

A computer implemented method for localization of an object, such as a license plate, in an input image includes generating a task-dependent representation of the input image based on relevance scores for the object to be localized. The relevance scores are output by a classifier for a plurality of locations in the input image, such as patches. The classifier is trained on patches extracted from training images and their respective relevance labels. One or more similar images are identified from a set of images, based on a comparison of the task-dependent representation of the input image and task-dependent representations of images in the set of images. A location of the object in the input image is identified based on object location annotations for the similar images.

24 Claims, 4 Drawing Sheets

(56) References Cited

U.S. PATENT DOCUMENTS

2012/0269398 A1 10/2012 Fan et al.
2014/0037198 A1* 2/2014 Larlus-Larrondo et al. ... 382/159

OTHER PUBLICATIONS

U.S. Appl. No. 13/592,961, filed Aug. 23, 2012, Rodriguez-Serrano.
U.S. Appl. No. 13/224,373, filed Sep. 2, 2011, Rodriguez-Serrano.
U.S. Appl. No. 13/300,124, filed Nov. 18, 2011, Rodriguez-Serrano.
U.S. Appl. No. 13/441,294, filed Apr. 6, 2012, Bernal, et al.
U.S. Appl. No. 13/461,191, filed May 1, 2012, Wang, et al.
U.S. Appl. No. 13/464,357, filed May 4, 2012, Fan, et al.
U.S. Appl. No. 13/567,309, filed Aug. 6, 2012, Larlus-Larrondo, et al.
U.S. Appl. No. 13/592,961, filed Aug. 23, 2012, Rodriguez-Serrano, et al.
U.S. Appl. No. 13/757,014, filed Feb. 1, 2013, Rodriguez-Serrano, et al.
Alves, et al. "Text localization in scene images by morphological filters" SIBGRAPI 2009, pp. 1-2.
Nguyen, et al. "Tensor voting based text localization in natural scene images" IEEE Signal Processing Letters, vol. 17, No. 7, Jul. 2010, pp. 639-642.
Comelli, et al. "Optical recognition of motor vehicle license plates", IEEE Trans. on VT, vol. 44, No. 4, Nov. 1995, pp. 790-799.
Epshtein, et al. "Detecting text in natural scenes with stroke width transform" CVPR, 2010, pp. 2963-2970.
Mikolajczyk, et al. "A comparison of affine region detectors" Intl. J. Computer Vision, vol. 65, No. ½, 2005, pp. 43-72.
Mikolajczyk, et al. "An Affine invariant interest point detector" ECCV, 2002, pp. 128-142.
Mikolajczyk, et al. "A Performance Evaluation of Local Descriptors" IEEE Transaction on Pattern Analysis and Machine Intelligence 27, Jun. 2005, pp. 1615-1630.
Lowe. "Distinctive image features from scale-invariant keypoints" IJCV 2004, vol. 60, pp. 91-110.
Perronnin, et al. "Fisher kernels on visual vocabularies for image categorization" CVPR 2007, pp. 1-8.
Perronnin, et al. "Improving the fisher kernel for large-scale image classification" Proc. $11^{th}$ European Conf. on Computer Vision, Part IV, 2010, pp. 143-156.
Sanchez, et al. "High-dimensional signature compression for large-scale image classification" CVPR 2011, pp. 1665-1672.
Csurka, et al. "An efficient approach to semantic segmentation", IJCV, vol. 95, Issue 2, 2011, pp. 198-212.
Johnson, et al. "Clustered pose and nonlinear appearance models for human pose estimation" Proc. $21^{st}$ British Machine Vision Conf. 2010, pp. 1-11.
Kuettel, et al. "Figure-ground segmentation by transferring window masks", 2012 IEEE Conference on Computer Vision and Pattern Recognition (CVPR), 2012, pp. 558-565.
Marchesotti, et al. "A framework for visual saliency detection with applications to image thumbnailing" ICCV, 2009, pp. 2232-2239.
Perronnin, et al. "Large-scale image retrieval with compressed fisher vectors" CVPR, 2010, pp. 3384-3391.

* cited by examiner

DATA DRIVEN LOCALIZATION USING TASK-DEPENDENT REPRESENTATIONS

BACKGROUND

The exemplary embodiment relates to object localization and finds particular application in connection with a system and method which uses probability maps generated for similar images to localize a target object region for segmenting a selected image.

Object localization relates to determining the location of a target object in an image. Image segmentation approaches have been developed for locating specific types of objects in photographic images and are used in a number of business applications. For example, photographs of vehicles may be subjected to segmentation techniques to identify the region of the image which corresponds to a license plate. OCR or other text recognition techniques may then be applied to this region to identify the license number or to see if it matches another license plate.

Some existing segmentation techniques are based on heuristics which exploit the a priori known characteristics of the object to be segmented, such as characteristics of text. For example, some exploit the frequent presence of horizontal and vertical edges. See, for example, Wonder Alves, et al., "Text localization in scene images by morphological filters," in *SIBGRAPI*, 2009, and Toan Dinh Nguyen, et al., "Tensor voting based text localization in natural scene images," *IEEE Signal Processing Letters*, 17, July 2010. Others rely on high local contrast or constant stroke width. See, for example, Paolo Comelli, et al., "Optical recognition of motor vehicle license plates." *IEEE Trans. on VT*, 44, November 1995; and Boris Epshtein, et al., "Detecting text in natural scenes with stroke width transform," in *CVPR*, pages 2963-2970, 2010 (hereinafter, "Epshtein"). These techniques have rather narrow applicability, since the prior knowledge of the images of the task of interest is incorporated into the software, and therefore such methods do not generalize well to segmentation tasks other than the ones for which they have been designed.

One approach for object localization is described in copending application Ser. No. 13/351,038, filed on Jan. 16, 2012, entitled IMAGE SEGMENTATION BASED ON APPROXIMATION OF SEGMENTATION SIMILARITY, by José Antonio Rodríguez Serrano (hereinafter, "the '038 application"). There, the object location for an image is determined by first computing the similarity between the image and each of a set of database images in which a similar object of interest has been localized, and then the location information of the object in the most similar image is transferred to the input image or combining the locations for the top-K most similar images. In the case of license plates, for example, when the target text region occupies only a small portion of the image, a two-stage method of object localization, which is particularly useful for such situations, can be used, as described in U.S. application Ser. No. 13/592,961, filed Aug. 23, 2012, entitled REGION REFOCUSING FOR DATA-DRIVEN OBJECT LOCALIZATION, by Jose A. Rodriguez-Serrano, et al. (hereinafter, "the '961 application").

Both of these applications use a data-driven approach for object localization which has advantages in terms of simplicity and speed. To compute the similarity, a representation of the image is computed, which allows similarity between images to be computed as the dot product between their representations. The features used to compute the image representations are generic (i.e., task-independent) image features, such as Fisher vectors, which have been shown to perform accurately across a range of computer vision tasks such as image categorization or retrieval. However, the image representation itself is not particularly tailored for a localization task. An improvement in the performance of the method can be achieved using similarities optimized for a localization task (by learning a metric), referred to as "task-dependent similarities," as described in the '961 application, but the task-independent image features are maintained and the metric learning can be computationally expensive.

There remains a need for a system and method for segmentation which can utilize features tailored for the task of localization.

INCORPORATION BY REFERENCE

The following references, the disclosures of which are incorporated herein by reference in their entireties, are mentioned:

U.S. application Ser. No. 13/224,373, filed on Sep. 2, 2011, entitled TEXT-BASED SEARCHING OF IMAGE DATA, by José Antonio Rodríguez-Serrano, et al.

U.S. application Ser. No. 13/300,124, filed on Nov. 18, 2011, entitled METHODS AND SYSTEMS FOR IMPROVED LICENSE PLATE SIGNATURE MATCHING BY SIMILARITY LEARNING ON SYNTHETIC IMAGES, by José Antonio Rodríguez-Serrano, et al.

U.S. application Ser. No. 13/441,294, filed on Apr. 6, 2012, entitled VIDEO-BASED DETECTOR AND NOTIFIER FOR SHORT-TERM PARKING VIOLATION ENFORCEMENT, by Edgar Bernal, et al.

U.S. application Ser. No. 13/461,191, filed on May 1, 2012, entitled A SYSTEM AND METHOD FOR STREET-PARKING VEHICLE IDENTIFICATION THROUGH LICENSE PLATE CAPTURING, by Yao Rong Wang, et al.

U.S. application Ser. No. 13/464,357, filed on May 4, 2012, entitled LICENSE PLATE CHARACTER SEGMENTATION USING LIKELIHOOD MAXIMIZATION, by Zhigang Fan, et al.

U.S. application Ser. No. 13/494,302, filed on Jun. 12, 2012, entitled GEOMETRIC PRE-CORRECTION FOR AUTOMATIC LICENSE PLATE RECOGNITION, by Zhigang Fan, et al.

application Ser. No. 13/351,038, filed on Jan. 16, 2012, entitled IMAGE SEGMENTATION BASED ON APPROXIMATION OF SEGMENTATION SIMILARITY, by José Antonio Rodríguez-Serrano.

U.S. application Ser. No. 13/567,309, filed Aug. 6, 2012, entitled IMAGE SEGMENTATION USING HIERARCHICAL UNSUPERVISED SEGMENTATION AND HIERARCHICAL CLASSIFIERS, by Diane Larlus-Larrondo, et al.

U.S. application Ser. No. 13/592,961, filed Aug. 23, 2012, entitled REGION REFOCUSING FOR DATA-DRIVEN OBJECT LOCALIZATION, by José Antonio Rodríguez-Serrano, et al.

U.S. application Ser. No. 13/757,014, filed Feb. 1, 2013, entitled LABEL-EMBEDDING FOR TEXT RECOGNITION, by José Antonio Rodríguez-Serrano, et al.

U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.

U.S. Pub. No. 20100226564, entitled FRAMEWORK FOR IMAGE THUMBNAILING BASED ON VISUAL SIMILARITY, published Sep. 9, 2010, by Luca Marchesotti, et al.

U.S. Pub. No. 20120106781, published May 3, 2012, entitled SIGNATURE BASED DRIVE-THROUGH ORDER TRACKING SYSTEM AND METHOD, by Vladimir Kozitsky, et al.

U.S. Pub. No. 20120143853, published on Jun. 7, 2012, entitled LARGE-SCALE ASYMMETRIC COMPARISON COMPUTATION FOR BINARY EMBEDDINGS, by Albert Gordo, et al.

U.S. Pub. No. 20120269398, published on Oct. 25, 2012, entitled METHOD AND SYSTEM FOR IDENTIFYING A LICENSE PLATE, by Zhigang Fan, et al.

BRIEF DESCRIPTION

In accordance with one aspect of the exemplary embodiment, a method for object localization in an image includes, for an input image, generating a task-dependent representation of the input image based on relevance scores for an object to be localized. The relevance scores are output by a classifier for a plurality of locations in the input image. At least one similar image is identified from a set of images, based on the task-dependent representation of the input image and task-dependent representations of images in the set of images. A location of the object in the input image is identified based on an object location annotation for at least one of the at least one similar images identified in the set of images. At least one of the generating of the task-dependent representation, identifying of the at least one similar image, and the identifying a location of the object in the input image may be performed with a computer processor.

In accordance with another aspect of the exemplary embodiment, a system for object localization in images includes a patch representation generator which generates patch-based representations of a plurality of patches of an input image. A classifier component classifies each of the patches with a trained classifier model based on the respective patch-based representation. A signature generator generates a task-dependent representation of the input image based on the classifications of the patches. A retrieval component is configured for retrieving at least one similar image from a set of images, based on a comparison measure between the task-dependent representation of the input image and task-dependent representations of images in the set of images. A segmentation component segments the image based on a location of an object in the at least one similar image and identifies a location of an object in the input image based thereon. A processor implements the patch representation generator, classifier component, signature generator, and segmentation component.

In accordance with another aspect of the exemplary embodiment, a method for object localization in an image includes, for each of a set of test images, generating a patch-based representation of a plurality of patches of the test image with a generative model, classifying each of the test image patches with a trained classifier model based on the respective patch-based representation, and generating a task-dependent representation of each of the test images based on the classifications of the patches of the test image. The method further includes generating patch-based representations of a plurality of patches of an input image with the generative model, classifying each of the patches of the input image with the trained classifier model based on the respective patch-based representation, and generating a task-dependent representation of the input image based on the classifications of the patches of the input image. At least one similar test image is retrieved from the set of test images, based on a comparison measure between the task-dependent representation of the input image and the task-dependent representations of the test images in the set of test images. The input image is segmented based on a location of an object in the at least one similar test image and a location of an object in the input image is identified, based on the segmentation. At least one of the generating the patch-based representations, classifying each of the image patches, retrieval of the similar test image(s), and segmentation of the input image may be performed with a processor.

DETAILED DESCRIPTION

Aspects of the exemplary embodiment relate to a system and method for object localization in images. In the exemplary embodiment, image segmentation is seen as a retrieval problem, as in other data-driven approaches, but employs a task-dependent image representation. The exemplary task-dependent representation uses knowledge about the object class(es) to be localized. In this way, the retrieval operation is applied on a representation space that is better suited for the localization task. Specifically, instead of computing a similarity between generic image features, a foreground/background classifier is applied on local patches in the image to obtain a probability map of regions likely containing the object. Rather than comparing image features of query and annotated images, the probability maps are compared for the retrieval. Location annotations for the retrieved image(s), which are generated independently of the probability maps (e.g., based on manual annotations of the images), are then used to identify a probable location of the object in the query image.

Figure 1:
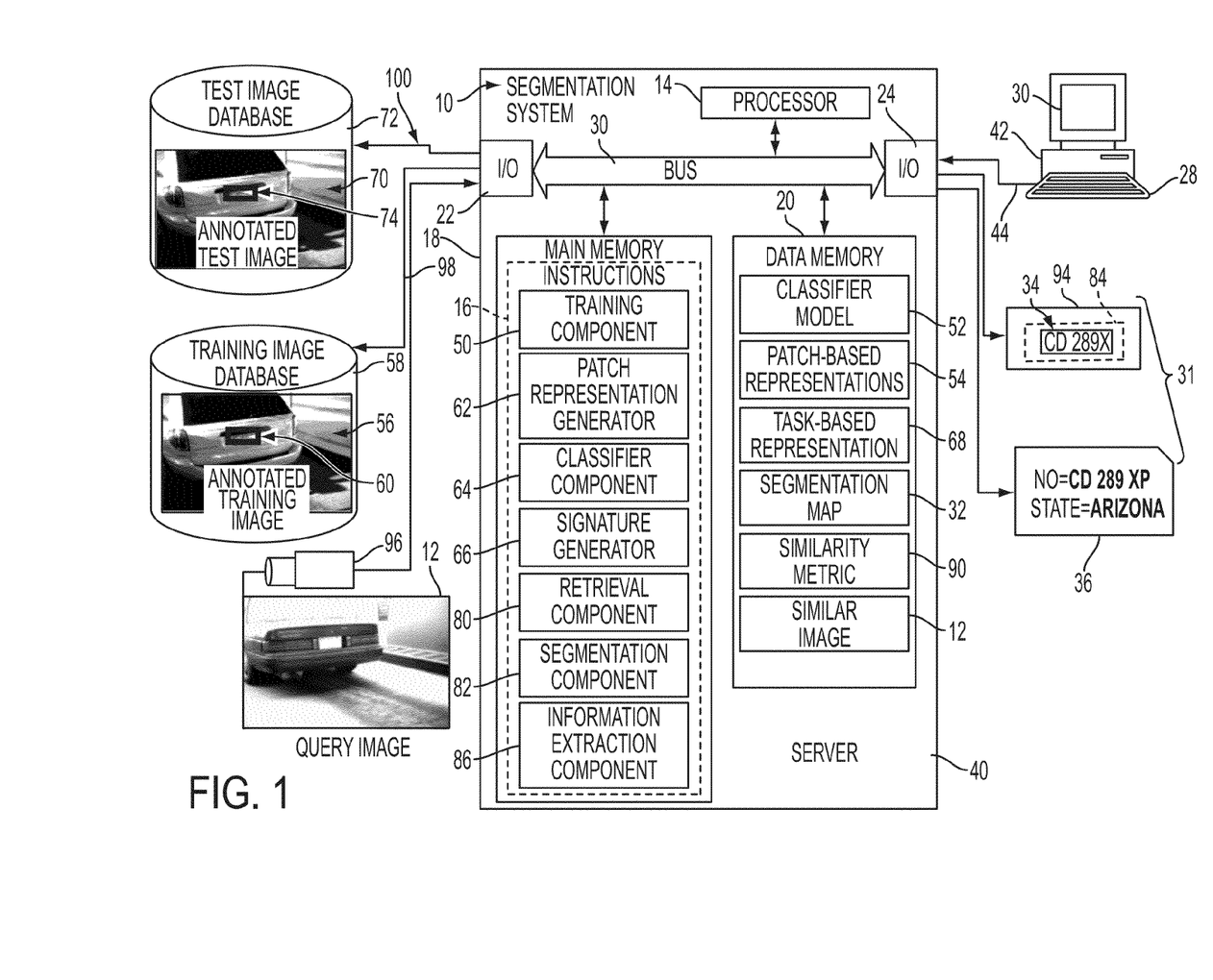
FIG. 1 is a functional block diagram of a system for object localization (segmentation) in accordance with one aspect of the exemplary embodiment.

FIG. 1 illustrates a computer-implemented system 10 for object localization in a query image 12, such as the exemplary photograph of a vehicle. The illustrated system 10 includes a processor 14, which implements at least a part of the method shown in FIG. 2 by execution of software processing instructions 16. These are stored in non-transitory memory of the system, such as main memory 18, which is communicatively connected to the processor 14. Processor 14 may also control the overall operation of the computer system 10 by execution of instructions stored in main memory 18. Data memory 20, which may be separate from or integral with main memory 18, stores the input image 12 during processing. Computer system 10 also includes one or more input/output interfaces 22, 24 for communicating with external devices and/or external memory. The interface 22 is configured for receiving the image 12 and may include a modem linked to a wired or wireless network, such as a local area network or wide area network, such as the Internet, a portable memory receiving component, such as a USB port, disk drive, or the like. The interface 24 may communicate with one or more of a display device 26, for displaying information to users, speakers, and a user input device 28, such as a keyboard or touch or writable screen, and/or a cursor control device, such as mouse, trackball, or the like, for inputting text and for communicating user input information and command selections to the processor 14. The various hardware components 14, 18, 20, 22, 24 of the system 10 may be all connected by a bus 30. The system outputs information 31, such as information 32 concerning the location of an object 34, such as a license plate, in the query image, or information extracted from or based on the region corresponding to the identified location, such as license plate data 36, such as alphanumeric characters, state of origin, and other data. In the license plate images shown in the FIGURES, the original license plate data 36 has been replaced with synthetic data for ease of illustration and confidentiality.

System 10 is hosted by a computing device 40, such as the illustrated server computer. As will be appreciated, server 40 may be remote from the display device 26 and user input device 28, which may be associated with a client device 42 that is linked to the computer 40 via a wired or wireless link(s) 44, such a local area network or a wide area network, such as the Internet. In other embodiments, the display device 26 and user input device 28 may be directly linked to the computer 40.

The instructions 16 include a training component 50 for training a patch classifier 52 on representations 54 of patches extracted from a set of annotated training images 56 stored in an image database 58. Each training image 56 includes or is otherwise associated in memory with an annotation 60, such as information on the location of a rectangular bounding box, which indicates the location of an object of interest in the training image 56, such as a license plate. Based on the annotation 60, each patch of the respective training image is labeled to indicate its overlap with the object of interest. The label may indicate the degree of overlap with the object of interest.

A patch representation generator 62 generates a respective patch-based representation 54 for each of a set of patches extracted from each training image 56, based on features extracted from the patch. The patch-based representations and patch labels for the training image patches are used to train the patch classifier model 52.

A classifier component 64 receives a plurality of patch representations 54 of an image to be compared and inputs them to the trained classifier model 52. The classifier model outputs a relevance score for the object for each patch, such as a probability, which indicates degree of object presence at the patch location.

A signature generator 66 generates a task-dependent representation 68 of each image to be compared. The task-dependent representation 68 may be in the form of a pixel probability map, or a vectorial representation thereof, which is derived from the patch probabilities for the patches of that image generated by the classifier component 64. In this way, a task-dependent representation 68 is generated by the signature generator 66 for the unlabeled query image 12. Task-dependent representations 68 are also generated in the same manner for one or more annotated test images 70 that are stored in a test image database 72. Each of the test images 70 includes or is otherwise associated in memory with an annotation 74, such as information on the location of a rectangular bounding box. The annotation indicates the location of an object of interest in the test image 70, such as a license plate (analogous to annotations 60). The annotation 74 is derived at least partly manually, from information on the object's location supplied by a human reviewer viewing the image 70. As will be appreciated, while the training images 56 and test images 70 are shown as separate sets 58, 72 of images, in other embodiments, there may be at least a partial overlap between the image sets/databases.

A retrieval component 80 retrieves one or more of the test images 70, based on a comparison measure computed between the task-dependent representation 68 of the query image 12 and the task-dependent representations 68 of the test images 70.

A segmentation component 82 segments the query image 12 based on the annotations 74 of one or more of the retrieved most similar test images 70 to generate a segmentation map 32 or other representation indicating the likely location of the object of interest in the query image itself or in a cropped portion thereof. For example, a bounding box 84 indicating the predicted location of the license plate data is generated.

In some embodiments, an information extraction component 86 extracts information 36 from the query image 12, such as the license plate data (e.g., license plate number, state information, logo, combination thereof, etc.).

In some embodiments, the task-dependent representations 68 are embedded in a space in which the selected comparison measure, such as a dot product, is a good comparison measure. For example, the training component 50 learns a similarity metric 90 using some of the training images 56. The similarity metric 90 may be incorporated into a function which computes the comparison measure, as described in the '038 and '961 applications, incorporated herein by reference.

In some embodiments the system uses a two-(or more) stage method for identifying the segmentation map 32 of a query image 12. A segmentation map is generated for the image as a whole which indicates an approximate location of the object, and this is used to identify a cropped region 94 of the image around the approximate location of the object of interest. The process is repeated using the cropped region 94 as the query image. In this embodiment, the comparison is computed between a task-dependent representation 68 of the cropped region 94 and task-dependent representations 68 of cropped test images. The cropped test images may be derived from respective test images 70 by cropping an area around the bounding box 74. Such a method is described in the '961 application and is particularly suited to cases where the object of interest forms a relatively small part of the query image, as is the case for the license plate number of image 12. This two-stage method may employ a different similarity metric 90 for each stage of the method, where such similarity metrics are used.

In some embodiments, the segmented image 12 may be input to a further segmentation method. For example, a more computationally expensive segmentation technique, such as a graph-cut method, may be applied to one of the segmented regions, such as the foreground (object) region 94 to refine the segmentation before outputting the segmentation map and/or processing the image with the information extraction component 86. In other embodiments, the output of a combination of segmentation techniques, which include the exemplary method, may be used as the basis for segmenting the image.

In some embodiments the system 10 may be configured for identifying two or more different classes of objects of interest, such as people, vehicles, buildings, and so forth. In this embodiment, a classifier model 52 may be trained for each class, which is trained on different labels for the extracted patch-based representations. The retrieval component 80 may retrieve a set of test images for each class or may be configured to retrieve test images which score well on two (or more) classes.

The query image 12 may be input to the system from any suitable source of images 96, such as a camera, scanner, workstation, database, memory storage device, such as a disk, or the like or other memory configured for storing acquired images.

Databases 58, 72 may be separate or combined and may be stored in remote memory linked to the system by wired or wireless links 98, 100. Alternatively, the images, and/or information extracted therefrom, may be stored in memory of the system.

As will be appreciated, when the classifier model 52 has been trained (and similarity metric(s) 90 optionally learned), the training component 50 is no longer needed and can be omitted from the system. Alternatively, the training may be performed with a separate computing device.

The output of the system 10 may be the segmented image 12 and/or cropped image 94, and/or information 36 extracted from the segmented image (e.g., the characters identified in the license plate region 84).

The computer system 10 may include one or more computing devices 40, such as a PC, such as a desktop, a laptop, palmtop computer, portable digital assistant (PDA), a server computer, cellular telephone, tablet computer, pager, combination thereof, or other computing device capable of executing instructions for performing the exemplary method. For example, the segmentation may be performed on a server computer and the results output to a linked client device 42, which may include hardware similarly configured to the server computer 40, except as noted.

The memory 18, 20 may be separate or combined and may represent any type of non-transitory computer readable medium such as random access memory (RAM), read only memory (ROM), magnetic disk or tape, optical disk, flash memory, or holographic memory. In one embodiment, the memory 18, 20 comprises a combination of random access memory and read only memory. In some embodiments, the processor 14 and memory 18 may be combined in a single chip.

The digital processor 14 is a hardware component and can be variously embodied, such as by a single-core processor, a dual-core processor (or more generally by a multiple-core processor), a digital processor and cooperating math coprocessor, a digital controller, or the like. The exemplary digital processor 14, in addition to controlling the operation of the computer system 10, executes instructions stored in memory 18 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
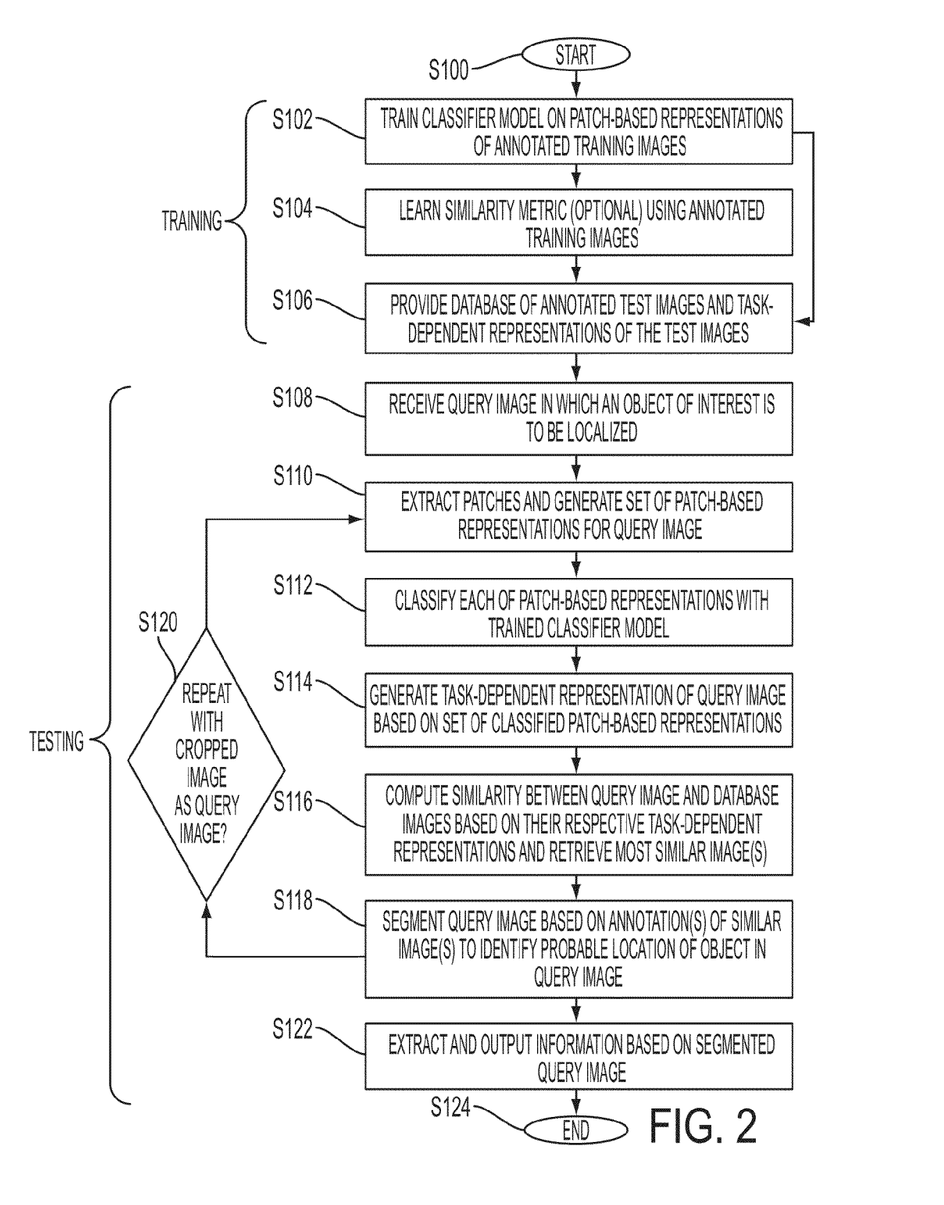
FIG. 2 is a flow chart illustrating a method for object localization in accordance with another aspect of the exemplary embodiment.

FIG. 2 illustrates an exemplary method for object localization in images, cast as a retrieval problem, where the output location of the object is based on the location of the object location(s) in the most similar images in an annotated set, where similarity is computed with a task-dependent image representation derived from a classifier which indicates degree of object presence at a particular location. The method is shown as including a training phase and a testing phase, which may be performed separately, e.g., by separate computing devices. The training phase of the method begins at S100.

At S102, a patch classifier model 52 is learned by the training component 50 on patch-based representations of patches of annotated training images and their respective relevance labels. In some embodiments, where a two-stage method is employed, using cropped images in the second stage, a separate classifier model is learned using the cropped training images 94. In the exemplary embodiment, the same classifier is used in both stages. Where objects in different object classes are to be recognized in the image 12, a different classifier may be learned for each object class.

Optionally, at S104, a similarity metric 90 is computed. In some embodiments, where a two-stage method is employed, using cropped images in the second stage, a separate similarity metric 90 is learned using the cropped training images.

At S106, a database 74 of annotated test images 70 (and optionally cropped images generated therefrom) is provided. For each of the annotated test images 70 (and cropped images, if also used), a task-dependent representation 68 is generated, in the same manner as described in steps S110-S114 below for the query image 12. This ends the training phase.

Figure 3:
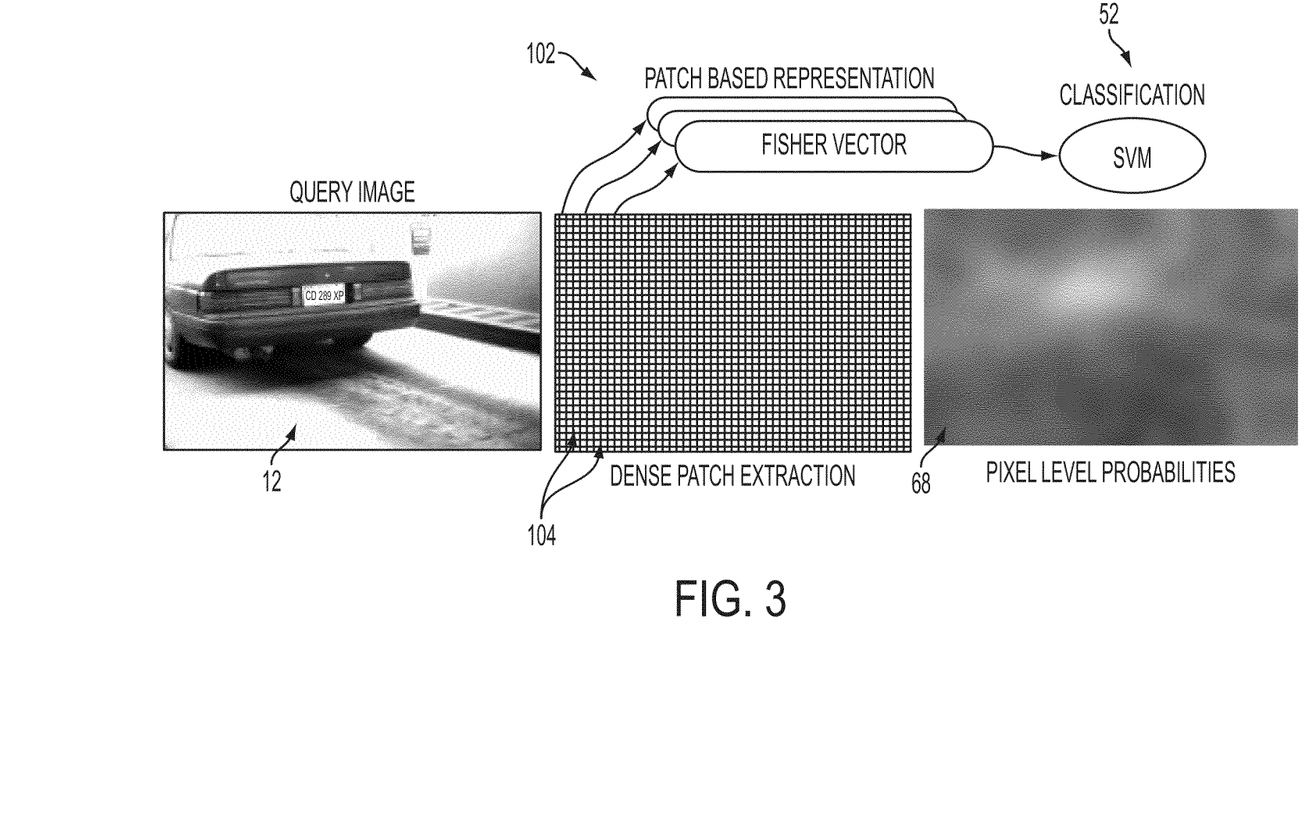
FIG. 3 graphically illustrates generating a task-dependent representation of a query image.
Figure 4:
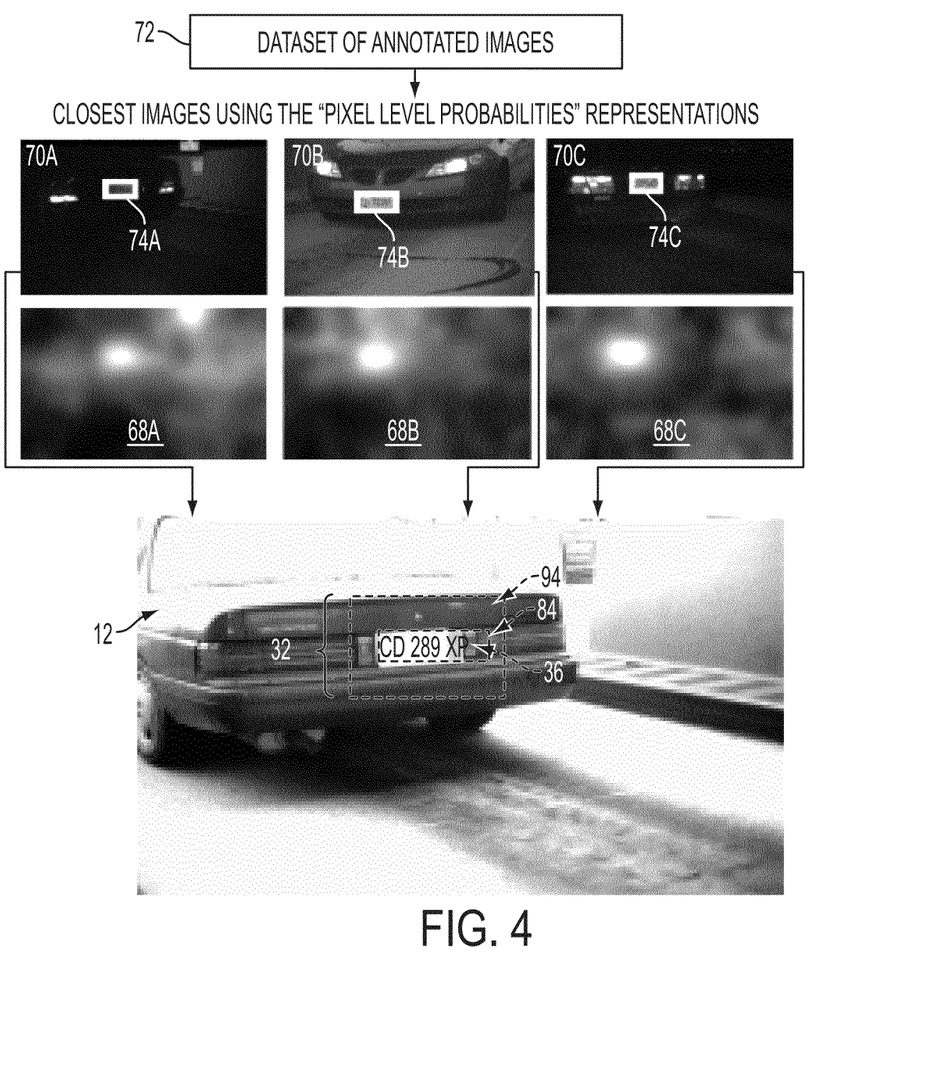
FIG. 4 graphically illustrates retrieving similar annotated images based on their task-dependent representations and segmenting the query image based on the annotations of the similar images.

The testing phase, which is graphically illustrated in FIGS. 3-4, may then be performed.

At S108, a query image 12 to be segmented to locate an object region is received. At this stage, the location of an object in the selected class of objects (e.g., license plates) within the image 12, is generally unknown, and is to be localized.

At S110, a patch-based representation 102 is generated for each of a set of patches 104 extracted from the query image 12, by the patch representation generator 62. The exemplary patch-based representations 102 are each multidimensional vectors of a fixed length which is independent of the number of pixels in the respective patch.

At S112, the patches 104 of the patches of the query image 12 are each classified, based on their respective patch-based representation 102, by the classifier component 64, using the trained classifier model 52. The output of the classifier model may be a probability, for each patch 104, of being in a region of interest, or other measure of a degree of presence of the object of interest in the patch.

At S114, a task-dependent representation 68 of the query image 12 is generated, based on the classified patches. In particular, a task-dependent representation for the query image 12 is generated by the signature generator 66, based on the patch probabilities. The task-dependent representation may be in the form of a probability map or a vectorial representation thereof. FIG. 3 illustrates the probability map with different grayscale densities for the probabilities, white indicating a high probability and black a low probability.

At S116, a comparison measure, such as a similarity measure, is computed between the task-dependent representation 68 of the query image 12 and task-dependent representations of test images 70 that have been generated in a similar manner. The similarity may be computed in an embedding space by embedding the task-dependent representations 68 of the query image and test images using the learned similarity metric. Based on the computed similarity measures, one or more similar test images 70 may be retrieved, such as the top-K most similar test images, where K may be, for example a predefined number such as, 1, 2, 5, or 10. Optionally, a threshold on similarity is established such that no test image is retrieved unless it meets the similarity threshold. FIG. 4 shows the probability maps 68A, 68B, 68C for three nearest neighbors 70A, 70B, 70C, by way of example.

At S118, the query image 12 is segmented based on the annotations 74 of the retrieved similar test images, to identify a region of interest, such as a location of the object to be identified in the image. FIG. 4 shows the three nearest neighbor images 70A, 70B, 70C with their segmentation maps (bounding boxes) 74A, 74B, 74C imposed on them, by way of example. These are aggregated to identify a segmentation map 32 for the query image.

Optionally, at S120, the method may return to S110, for one or more iterations in which a cropped portion 94 of the query image which bounds the identified region of interest in an earlier iteration is used as the query image.

A final segmentation map 32 for the query image 12, or other information based thereon which indicates the location of the object in the query image, is thus computed and output. This is illustrated in FIG. 4 by the location of bounding box 84, whose corner coordinates can be computed with respect to a corner of the query image 12 or with respect to the cropped region 94.

At S122, information 36 may be extracted from the segmented region 84.

The method ends at S124.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 40, (for example, an internal hard drive of RAM), or may be separate (for example, an external hard drive operatively connected with the computer), or may be separate and accessed via a digital data network such as a local area network (LAN) or the Internet (for example, as a redundant array of inexpensive of independent disks (RAID) or other network server storage that is indirectly accessed by the computer 40, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing one or both stages of the flowchart shown in FIG. 2, can be used to implement the method for segmenting an image. As will be appreciated, while the steps of the method may all be computer implemented, in some embodiments one or more of the steps may be at least partially performed manually.

Further details of the system and method will now be described.

Images to be Compared

In one embodiment, images 12, 56, 70 are all of the same class of objects, such as photographs of vehicles, people, faces, images of document pages, or the like. In another embodiment, images may include objects from different classes, such as images of people with dogs. In this embodiment, not all the training images need to include an object in all classes. For example, there may be images of people without dogs, images of people with dogs, and images of dogs without people in the set of training (and testing) images. In this embodiment, annotations 60, 74 are provided for each image and labeled with a respective label for the class. Each image 56, 70 in the training and testing sets includes at least one annotation.

The images 12, 56, 70 may be converted to monochrome (black and white) prior to processing with the system. Images 12, 56, 70 may be received by the system 10 in any convenient file format, such as JPEG, GIF, JBIG, BMP, TIFF, or the like or other common file format used for images and which may optionally be converted to another suitable format prior to processing. Input images may be stored in data memory 20 during processing. The images may be individual images, such as photographs, or video images. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (Cat*, RGB, YCbCr, etc.). The word "color" is used to refer to any aspect of color which may be specified, including, but not limited to, absolute color values, such as hue, chroma, and lightness, and relative color values, such as differences in hue, chroma, and lightness.

The query image 12 may be resized (e.g., scaled and/or cropped) to the same dimensions as the database test images 70, e.g., to a fixed number of pixels in x and y directions, for ease of computation. In other embodiments size modification is performed on the probability map. In one embodiment, the image 12 is not among the images 56 used in training, nor among the test images 70 in set 72, although in other embodiments, this situation is not excluded.

Classifier Training (S102)

The classifier model 52 is trained on patch-based representations 54 of patches extracted from training images 56 and their respective relevance labels. The generation of the patch-based representations 54 is described below. Each relevance label represents the overlap between the given patch and the annotation region 60 of the respective training image.

The images in the training set may have been manually annotated with localization information 60, such as coordinates of a bounding box enclosing the object of interest. In other embodiments, the annotations 60 may be at least partially computed automatically, for example from information associated with the image. In the specific case of license plate detection, the localization information 60 may include the rectangle coordinates of the plate. For example, x,y coordinates of two or more corners of the license plate, with respect to a corner of the image 56, may be identified. The rectangle may be oriented with its longest dimension aligned with the x or y axis. In other embodiments, the rectangular bounding box may be permitted to have a degree of skew, such that its longest dimension is angled to the horizontal, e.g., at from 1°-89°. In some embodiments, the aspect ratio of the rectangle may be fixed. In other embodiments, the aspect ratio of the bounding box may vary between training images.

As will be appreciated, the annotations 60 can be representative of other shapes depending on the object of interest to be localized, such as regular polygons, irregular polygons, or irregular shapes, such as an approximate outline of a human or animal face or a person's or animal's body. In other embodiments, the annotation may consist of an image mask defining the exact pixel locations comprising the object of interest.

A relevance label is generated for each patch, based the overlap of the patch with the area of the object of interest, e.g., as identified by its bounding box 60. The patch representations and patch labels are used by the training component to generate the classifier model 52.

In one embodiment, the patch relevance labels are binary, e.g., positive if the patch and the bounding box intersect and negative otherwise.

In another embodiment, the patch labels are scalar values which indicate the degree of overlap. In this exemplary embodiment, the label may computed as a function of the area of overlap (intersection) between the patch and the bounding box, as follows.

$$\text{Label} = f(P \cap B) \quad (1)$$

where P represents the area of the patch and B represents the area of the bounding box 60.

In one specific embodiment, the label may take into account the size of the patch and/or bounding box 60, e.g., as follows:

$$\text{Label} = \frac{P \cap B}{P \cup B} \quad (2)$$

The labels may be normalized to a scale of 0-1, for example.

In another embodiment, used in the examples below, the overlap is thresholded. For example, if the overlap computed, for example, by Eqn. 2, is less than a threshold value, the relevance label has a value of 0 and if the overlap is at least equal to the threshold, the value of the relevance label is 1 (or may be a scalar value l, where at least some labels have a value $0 < l < 1$).

Any suitable machine learning algorithm can be used for training the classifier, such as Support Vector Machines (SVM), Logistic Regression, Perceptron learning, Linear Discriminant Analysis (LDA), Naïve Bayes, or the like. In the exemplary method, a discriminative linear classifier (such as SVM) is used, and trained using the stochastic gradient descent algorithm.

Metric Learning (S104)

Metric learning may be used to generate a metric which can be used to embed the task-dependent representations into a different space. The '038 and '961 applications, incorporated herein by reference, describe metric learning (projection learning) methods, which can be applied herein in a similar manner.

In such a metric learning method, the aim is to find a metric, such as a projection matrix or vector, such that images with similar projected task-dependent representations have similar segmentation maps. The metric learning step may be an iterative process in which pairs of the task-dependent representations (as projected by the current projection matrix) are compared in turn and the projection matrix is updated based on whether the ranking of the pairs, based on the similarity of their projected task-dependent representations, is in agreement with a ranking based on the similarity of their segmentation maps (annotation coordinates). However, other machine learning methods are also contemplated. The final projection matrix 90 is stored in memory 20.

Generation of Patch-Based Representations (S110)

Patches are extracted from the respective image 12, 56, 70, 94, and for each patch, a patch representation 54 is generated, based on the image data within the patch. The patches, which are small image regions, may be extracted densely, e.g., on a grid, optionally at multiple scales, from the respective images 56, 70, 12, 94. Some or all of the patches may thus overlap one another and be of different sizes. The number of patches per image is not limited but can be for example, at least 16 or at least 64 or at least 128 patches. Each patch can include at least 16 or at least 64, or at least 128, or at least 256 pixels, and can include up to 10,000 pixels or more, depending on the number of pixels in the image. In one example embodiment, 32×32 pixel patches (1024 pixels) are extracted on regular grids (e.g., every 16 pixels) at five different scales, such as 64×64 pixel patches, and 128×128 pixel patches, and optionally up to the size of an image.

In another embodiment, the patches are extracted with a Harris affine detector (as described by Mikolajczyk and Schmid, in "An Affine Invariant Interest Point Detector", ECCV, 2002, and "A Performance Evaluation of Local Descriptors", in IEEE Conference on Computer vision and Pattern Recognition, June 2003). Other patch detection methods may be employed, as described, for example, in K. Mikolajczyk, et al., "A comparison of affine region detectors," Int'l. J. Computer Vision, Vol. 65, No. 1/2 (2005), and in U.S. Pub. Nos. 20070005356, 20070258648, and 20080069456, the disclosures of which are incorporated herein by reference in their entirety.

For each patch, a respective patch-based representation is generated. The patch-based representations can be any suitable representation of the pixels forming the patch. In the exemplary embodiment, the patch representations are statistical representations of low level features of the patch, such as color or gradient features. As an example, the patch-based representations are generated from SIFT descriptors or other gradient-based feature descriptors. See, e.g., Lowe, "Distinctive image features from scale-invariant keypoints," IJCV vol. 60 (2004). In one illustrative example employing SIFT features, the features are extracted from 32×32 and larger pixel patches, using 128-dimensional SIFT descriptors. More specifically, SIFT descriptors are generally Gaussian derivatives computed at eight orientation planes over a four-by-four grid of spatial locations, giving the 128-dimensional vector. The dimensionality of the vectors may be reduced, for example, using principal component analysis (PCA). Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used.

In some illustrative examples, the patch-based representation is a Fisher vector, which is computed for each patch by modeling the extracted patch descriptor (e.g., SIFT descriptor) using a generative model (e.g., a mixture model) to generate a corresponding vector having vector elements that are indicative of parameters of mixture model components of the mixture model representing the extracted patch descriptor. Each patch-based representation thus has the same number of dimensions, irrespective of the size of the patch or number of features extracted.

The exemplary mixture model can be a Gaussian mixture model (GMM) comprising a set of Gaussian functions (Gaussians) to which weights are assigned in the parameter training. There may be for example at least 20 or at least 50 Gaussians in the mixture model. Each Gaussian is represented by its mean vector, and covariance matrix. It can be assumed that the covariance matrices are diagonal. See, e.g., Perronnin and Dance, "Fisher kernels on visual vocabularies for image categorization" in CVPR (2007) (hereinafter, "Perronnin and Dance"). Methods for computing Fisher vectors are more fully described in U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., U.S. Pub. No. 20120045134, published Feb. 23, 2012, entitled LARGE SCALE IMAGE CLASSIFICATION, by Florent Perronnin, et al., and in Jorge Sanchez, et al., "Improving the fisher kernel for large-scale image classification," in Proc. $11^{th}$ European Conf. on Computer Vision (ECCV): Part IV, pp. 143-156 (2010), and in Jorge Sanchez and Florent Perronnin, "High-dimensional signature compression for large-scale image classification," in CVPR 2011, the disclosures of which are incorporated herein by reference in their entireties. The trained GMM is intended to describe the content of any patch within a range of interest (for example, a patch of a color or monochrome photograph of vehicles if the range of interest is license plates).

The Gaussian mixture model is trained offline on a large set of low-level features (e.g., SIFT descriptors) of training images, which can be drawn from the set 58, for example. The GMM can be trained in an unsupervised manner or in a supervised manner. A single generative model can be generated for all classes, as disclosed in Perronnin and Dance. Alternatively, a different generative model can be created for each class, as disclosed in U.S. Pub. No. 20070005356, incorporated herein by reference, and F. Perronnin, C. Dance, G. Csurka and M. Bressan, Adapted vocabularies for generic visual categorization, ECCV 2006. Thus, in the exemplary embodiment, there may be a generative model for the class "license plate" and another for "everything else". As an alternative to GMMs, the generative model may be based on Hidden Markov Models, or a combination of GMMs and HMMs. Examples of representations which can be generated by this method include Bag-of-visual word representations (where each Gaussian corresponds to a visual word) and Fisher vectors (gradient vectors that describe in which direction the parameters of the model should be modified to best fit the data), as described in U.S. Pub. No. 20100040285.

Classification of Patches Based on Patch-Based Representations (S112)

The trained classifier model 52 may output a relevance score for each patch of an image 12, 70, 94 representing the probability that the patch overlaps (partially or entirely) the object of interest in the image, based on the respective patch-based representation 54. For example, the score may be a scalar value in the range of 0-1, with values >0 and <1 being accorded to at least some of the patches.

Generation of Task-Dependent Representation of Image (S114)

The signature generator 66 generates a task-dependent representation 68 for the image 12, 70 based on the classifier scores of the patches that it contains.

For example, the patch scores can be transformed into probabilities at the pixel level, yielding a probability map 68. In this embodiment, each patch in which a pixel of the image is present contributes to the relevance score for that pixel. The patch scores may be weighted to reflect the difference in sizes of the patches. As an example, a suitable method for propagating patch level scores to the pixels of an image may be performed using the method described in G. Csurka and F. Perronnin, "An efficient approach to semantic segmentation," IJCV, Vol. 95, Issue 2, pp. 198-212, (2011), and in U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al., the disclosures of which are incorporated herein by reference in their entireties (hereinafter, collectively referred to as Csurka, et al.)

In that method, which may be used herein, a plurality of patches is extracted from an input image and for each patch, at least one high level feature (e.g., a Fisher vector) is extracted based on a low level representation (e.g., SIFT features) and a generative model (e.g., a Gaussian mixture model) built from such low level features (extracted from training images). For each patch, and for at least one object class, a relevance score is computed for the patch, based on the at least one high level feature and the output of at least one patch classifier 52. For at least some of the pixels of the image, a relevance score is computed for the at least one object class based on the patch scores. In particular, patch relevance scores are propagated to the pixels present in those patches. Since a pixel may be present in more than one patch, the pixel score may be derived from two or more patch scores, by interpolation. An object class label is assigned to each of the pixels based on the computed relevance score for the at least one object class.

In the present method, for each pixel, the object class label is the probability of the pixel being part of an object of interest, such as a license plate. For the pixels of the query image 12, a probability map 68 is generated which represents the probabilities of each of the pixels (or of groups of contiguous pixels). The probability map can be normalized, e.g., L2 normalized. The probability map can be resized to a fixed size, such as 100 pixels in each dimension, or less, e.g., 50×50. In some embodiments, the probability map is generated for only a representative set of the pixels, such as every second or fourth pixel, or the fixed size probability map represents a reduced pixel resolution map of the original probability map for the image. As will be appreciated, resizing may be performed on the input image rather than on the probability map, but this may impact the performance of the classifier.

The probability map may be converted to a vector, e.g., by concatenating the probabilities for each row (or column) of pixels in turn. This allows the task-dependent representations to be compared using a simple dot product or other similarity metric used for vectors.

In the exemplary embodiment used in the examples below, to make them comparable the probability maps of images 12, 70 to be compared are of the same dimensions and are normalized. Specifically, the probability maps are resized to a fixed size image of 50×50 pixels or less, converted to a vector, and L2 normalized (i.e. such that the square root of the sum of the squares of the vector elements is equal to 1). The representation thereby obtained is the task-dependent image representation 68 which has a fixed size, e.g., of 2500 dimensions.

In one embodiment, metric learning can be used on top of the task-dependent representations to further enhance the localization accuracy, as noted above. In this embodiment, the metric (such as a matrix or a vector) learned at S104 may be applied to the each of the task-dependent representations. In other embodiments, the similarity metric is incorporated into the computation of similarity.

It has been found that two images containing two cars that are quite different in appearance may still have very similar probability maps 68 due to a similar plate location. The exemplary task-dependent representations are thus useful for a retrieval problem in order to solve localization.

Computing Similarity (S116)

The similarity (or other comparison measure, such as distance) of two images 12, 70 can be computed as the similarity of their probability maps or other task-dependent representation based thereon. For example, the index i of the nearest image 70 (or set of nearest images) in set 72 is identified as i=argmax$_n$ k(x,x$_n$). Function k can be a kernel function, between the task-dependent representation of the input image 12 and the task-dependent representations of the large database images, optionally embedded in a new space using the learned metric. An exemplary kernel is a linear kernel, such as the dot product. This is a scalar value which is the sum of the products of the corresponding entries of the two vector's sequences of numbers. However, other similarity measures are also contemplated, such as the L1 distance (Manhattan distance), chi-squared distance, Euclidean distance, cosine similarity, Hamming distance, or the like. In the case of a vectorial representation and L2 normalization, the dot product is a particularly suitable comparison measure. For other comparison measures, a normalization method appropriate to the comparison measure is selected.

In another embodiment, the probability map is considered as a matrix of values and two probability maps are compared using a suitable measure for computing similarity between matrices, such as the Earth Mover's Distance.

At S116, the K most similar test images 70 are retrieved by the retrieval component from the image database 72, where K is at least 1 and can be, for example, up to 50, but desirably fewer than all images in the test image database. The annotations of the K most similar images can be combined to yield a localization estimate, for example, using a weighted average of the representations, when applicable. Tests may be performed on a test dataset to determine the optimum number K of images to be retrieved. For example, tests may be performed with 1, 2, 3, 4, 5, 10, etc. nearest neighbors to determine the optimum K which provides the highest performance, e.g., based on the overlap between the computed segmentation for an image and that image's ground truth segmentation.

The selection of a suitable comparison (similarity) measure may depend, in part, on the type of task-dependent representation used. The choice of similarity measure may also affect the loss function employed in the metric learning step (S104), if used.

The comparison measure may be a similarity function which applies the learned metric to the image task-dependent representations. For example, the similarity k between an input image x and a database image x$_n$ may have the form k(x, x$_n$)=x$^T$A$^T$Ax$_n$, where A is a learned metric in the form of a matrix which has been estimated through the similarity learning algorithm (S104) and T represents the transpose.

A separate learned metric (e.g., matrix) may be learned for the second iteration of the method (if used) where a cropped image is used as the query image.

In another embodiment, similarity is computed on the respective image signatures without using a learned projection matrix. In this method, the similarity function may be computed as the simple dot product between two task-dependent representations (i.e., of the input image 12 and one of the database images 70).

Optionally, a test may be automatically performed to determine whether the computed similarity between the (optionally projected) task-dependent representations of the image 12 and retrieved test image(s) 70 meets a predetermined confidence threshold on the similarity. If not, the method may end and a message may be sent to a user to the effect that no similarity image has been identified. Otherwise the method proceeds to S118.

The exemplary segmentation (S118) is not based on the probability maps 68 or other task-based representations of the K similar images 70, but rather on their annotations.

Image Segmentation (S118)

The segmentation map(s) (annotations 74) of the similar database image(s) 70 is/are retrieved and used to estimate a segmentation map for the input image automatically. The retrieved segmentation map of the similar database image 70 can be used directly as the segmentation map in the case of a single segmentation map. In the case of two or more segmentation maps, an average may be computed. A single segmented region 84 of the image is thus identified.

In the case of a second iteration, the segmentation map 32 of the image 12 is used to identify a cropped region 94, e.g., by automatically upscaling the coordinates of the segmented region of the image 12, to generate a slightly larger region, which serves as the query image for the next iteration.

Extraction of Information (S122)

The information 31 extracted may include license plate data 36, such as the characters of the license plate. In one embodiment, OCR is applied to the segmented region 84. Another method for extracting the characters is described U.S. application Ser. No. 13/757,014, filed Feb. 1, 2013, entitled LABEL-EMBEDDING FOR TEXT RECOGNITION, by José Antonio Rodríguez-Serrano, et al., incorporated by reference.

Another type of information which may be extracted is in object of interest matching. For example, a determination of whether the license plate present in the query image 12 is present within the set of test images may be based on whether the image content within the region 84 matches that of any of the bounding boxes 74 of a set of captured images, such as test images 70, a subset thereof, or a different set of images. In this embodiment, it is not necessary to identify the characters of the license plate, for example, but may be computed based on a representation of the content of the regions 84, 74 such as a Fisher vector. Similarly, the method may be used to determine whether a person (or a face) present in a query image 12 is present in any of the test images.

Other information 31 may be generated and output by the system, such as the registered owner of the vehicle present in the query image, as identified based on the license plate data, whether the vehicle is registered for automated toll payments, whether the vehicle has been in a particular location, such as a parking lot for a given time period, and so forth. For example, the method can be used in connection with improvement of traffic enforcement cameras, which are used to detect and identify vehicles based on license plate data, such as numbers, characters, states, and other data. For example, some uses of traffic enforcement cameras include toll collection interchanges or booths, speed limit violations, red light violations, bus lane enforcement, level crossing enforcement, high-occupancy vehicle enforcement, turn lane violations, and the like. Another application is in detecting or counting similar items, for inventory purposes.

While the exemplary method has been described in terms of a patch classifier 52, it is to be appreciated that other methods for generation of a task-dependent representation of the query image with a classifier which indicates a degree of object presence at locations in the query image are contemplated. For example, other class-specific representations that employ a classifier may also be used for this task. In one embodiment, pixels are classified directly. In another embodiment, transferring the patch classifications may result in labeling groups of pixels (super-pixels), rather than individual pixels, to reduce the computation cost.

Moreover, while the exemplary embodiment uses the output of the classifier 52 to represent each image solely as a probability map 68, in another embodiment, the task-dependent representation could be combined with another representation of the image, such as a Fisher-Vector representation, for example, by concatenating the two vectors, to build another task-dependent image representation.

In another embodiment, the probability map could be used to weight a sub-region-based global representation of an image. For example, when building a global Fisher-Vector (or other global statistical representation generated using a generative model, such as a Gaussian mixture model) of the image, the contribution of each sub-region of the image in this global representation may be weighted by the probability that that sub-region belongs to the target class, as provided by the exemplary probability map or even the classified patches. Here, "sub-region" denotes a region of an image, conventionally referred to as a "patch", but different terminology is used herein simply for clarity. The sub-regions may be generated in the same way as the patches described above and in some embodiments, may be the same areas as the patches. This task-based representation focuses more on the foreground object as coarsely predicted by the classifier and consequently may be more adapted to data-driven localization than standard Fisher vectors. Methods for generating global representations of an image using Fisher vectors are similar to the methods described herein for generating a Fisher Vector representation of a patch, but in the global representation, all of the sub-regions contribute to the overall representation of the image. See, for example, Perronnin and Dance and the related patent references mentioned above for methods of generating a global representation of an image based on a generative model.

The exemplary method has been illustrated in the case of binary segmentations (e.g., corresponding to an object region in the class of interest vs. the rest of the image), but may be extended to the case of localizing multiple objects from different classes. One example would be to localize simultaneously the license plate, the windshield, and the car body. The extension of the method to the multi-class problem may be achieved through the combination of multiple data-driven segmentation (i.e., retrieval) problems, one for each class, each with the relevant class-specific task-based representation. The multiple results could then be combined directly, or within a Conditional Random Field model. Another method for multi-class segmentation would be to enrich image representations with knowledge about all the classes to be segmented. For each per-class data-driven segmentation, each image is represented by a set of probability maps, one for each class of the multi-class problem. This representation is still task-dependent, as it encodes information about the object to segment, but it also encodes context information, in the form of the predicted location of other relevant objects.

Without intending to limit the scope of the exemplary embodiment, the following examples demonstrate the applicability of the method to two different object classes: vehicles and people.

EXAMPLES

Two datasets were used in the evaluation of the method. One was a database of vehicle images containing license plates captured at toll booths, and the other was a public database containing images of people in different poses (Leeds Sports Pose Dataset, see, Sam Johnson and Mark Everingham, "Clustered pose and nonlinear appearance models for human pose estimation," in Proc. $21^{st}$ British Machine Vision Conference, 2010 (BMVC2010). The image dataset is accessible at www.comp.leeds.ac.uk/mat4saj/lsp.html).

Given a query image, patches are extracted densely, described using Fisher Vectors, and then classified. The obtained pixel-level probability map is compared to the probability maps of a set of annotated images. Images with the closest probability maps are selected, and their ground truth annotations are transferred to the query image to predict the license plate location. For training the patch classifier 52, a training set consisting of images and localization information 60 was used. The localization information includes the rectangle coordinates of the plate. Patches 32×32 pixels in size are extracted densely and at multiple scales within all images of this training set. Low-level descriptors are computed for each patch (SIFT descriptors), and transformed into Fisher Vector representations (FVs) using the method of Perronnin and Dance. FVs computed on the patches of the training images and their labels are used to train a linear SVM classifier 52. The values of the patch labels correspond to "plate" and "background", determined by checking if the patch overlaps with the license plate region or not.

Once the patch classifier model 52 has been trained, an image is represented by computing FV representations of patches, as for the training images. These representations are input to the classifier model, and a score is inferred for each patch. The patch scores are transformed into probabilities at the pixel level (using the method of Csurka, et al.), yielding a probability map. As can be seen in FIG. 3, although the classifier 52 fires on regions other than the plate, the resulting probability map 68 represents a strong clue as to the localization of license plate. It is to be expected that two images with the license plate at similar positions will also have very similar probability maps. Additionally, classifier errors tend to be consistent between training and testing images. However, as the following examples demonstrate, using the probability maps directly to segment the image does not yield as high a performance as transferring the annotations from the similar images. Therefore, even in a difficult case where the probability map itself does not seem to reveal the plate location clearly, the closest probability maps in the database can help transferring the target location in a reliable way.

To make them comparable, the probability maps of test and query images are resized to a fixed size image, and L2 normalized. The obtained task-dependent representation of a query image can then be compared with task-dependent representations of annotated images. As the comparison measure, similarity between task-dependent representations is computed as the dot product (particularly suitable as the feature vectors are L2-normalized). Metric learning can be used on top of the task-dependent representations to further enhance the localization accuracy, but was not used in all examples.

1. Localization of License Plates

In this example, the application of the method to segmenting a license plate (LP) in images was evaluated. In this particular case, images are segmented into two regions, one for the plate (also referred to as foreground), and one for the background (i.e. everything else). Images were obtained at different toll plazas. These images contain a view of the full vehicle, and the goal is to be able to locate the license plate in each image. All images are annotated manually with a rectangle that provides the location of the plate. Images are split into 2 sets, a training set of 3837 images and a test set of 1001 images. The training set is used to train the license plate classifier 52, that is then applied to represent images as probability maps 68. This set is also used as the annotated dataset 72 to which retrieval is applied. Each image of the test set is considered individually as a query image. For each image, the location of the license plate is predicted using the described method, and compared to the ground truth. As in the '961 application a "refocusing" stage using a cropped image as the query image was applied. The refocusing stage was also used in the comparison methods.

To evaluate the performance of various methods at identifying the localization of the license plate, a union intersection measure was computed between the ground truth rectangle and the predicted rectangle. Accuracy is defined as the percentage of the predicted location for which the measure is above a given threshold.

The proposed method (task-dependent, in this example, without metric learning) was compared to three other methods. The first one considers localization as a retrieval problem using a generic image representation rather than a task-dependent one using the method described in the '038 application, and denoted Image Fisher-Vector (here the representation of an entire image is based on Fisher vectors for patches of the image and no classifier is used). The tests were performed with and without metric learning. The second comparison method produces an output using the probability maps, without considering retrieval. More precisely, the probability maps that are used to represent images are post-processed to directly predict location. A rectangle of the expected object size (fixed ratio at different scale) is slid over the image, and the rectangle that most likely contains the object is kept. This method is referred to as Probability Map+Best rectangle. The third comparison method is a text detector based on the stroke width transform method of Epshtein, and is denoted Text detection.

Table 1 shows the results obtained by the exemplary method and the three comparison methods on the test set. As in the '961 application, precision at 60% is reported, i.e., a plate detection is consider correct if the predicted output overlaps with the ground-truth by at least 60%.

TABLE 1

| Representation | Precision at 60% |
|---|---|
| Task-dependent (without metric learning) | 80.92 |
| Image Fisher vector (without metric learning) | 76.12 |
| Image Fisher vector (with metric learning) | 81.72 |
| Probability map + best rectangle | 79.02 |
| Text detection | 53.35 |

As can be seen from TABLE 1, the present task-dependent method achieves results that are almost as good as those obtained with Image Fisher vectors with metric learning, but without the need for metric learning, which can be a computationally expensive process. It also performs better than using the probability maps themselves or using text detection. Adding metric learning to the task-dependent representations did not yield a significant improvement in the case of license plate detection. Furthermore, the dimensionality of the FVs in the task-dependent method is 32K (reduced to 4K after a projection). The results presented in TABLE 1 are with probability maps resized to 50×50 pixels=2.5K dimensions. When reducing the size of the probability maps to 25×25=625 dimensions, a decrease of only 0.8% was observed. Thus, at runtime, the present method can employ much smaller feature vectors than in the case of Image Fisher vectors, which translates to significant speed improvements. Since retrieval is performed by applying a dot-product, the dimensionality of the representation has a direct impact on the speed of the method at test time.

2. Localization of Humans

The Leeds Sports Pose dataset (LSP) was used in a human detection task. The method was performed as for the license plate example, except as noted. To generate ground-truth rectangles for the humans posing in the LSP images, the annotations of body joint locations (knees, elbows, neck, etc.) provided with the dataset images were used to generate a bounding rectangle which encompassed all the body joint annotations for a person.

In the exemplary task-dependent method, it was found that metric learning, using more than 1 neighbor, and the refocusing step described in the '961 application yielded improvements in performance on this dataset, which is quite challenging as it includes images of humans in unconventional poses. As in the previous experiment, results were obtained for the method described in the '038 application. That method considers localization as a retrieval problem using a generic image representation (denoted Image Fisher-Vector+metric learning). The Probability Map+Best rectangle method was also tested, where probability maps are post-processed to directly predict location of the object, using a sliding window approach. The text-detector baseline was discarded as it is specific to license plates.

Results are shown in TABLE 2, where precision was computed at 50%, i.e., a human detection is consider correct if the predicted output overlaps with the ground-truth by at least 50%.

TABLE 2

| Representation | Precision at 50% |
|---|---|
| Task-dependent (without metric learning) | 40.30 |
| Task-dependent (with metric learning) | 44.50 |
| Image Fisher vector (without metric learning) | 36.6 |
| Image Fisher vector (with metric learning) | 43.06 |
| Probability map + best rectangle | 29.98 |

For this dataset, it can be seen that the exemplary task-dependent representation, with metric learning, outperforms the data-driven approach using FVs with metric learning. Unlike the experiment on license plates, where metric learning had little impact on the task-dependent method, the stronger effect of metric learning observed here can be attributed to the more challenging nature of the database and that the positive examples with which the patch classifier is fed contain more noise (as the rectangles do not accurately follow the silhouette of the subjects). The probability map+best rectangle method appears to be unable to capture the complex shape of the humans in challenging poses.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for object localization in an image comprising:
for an input image, generating a task-dependent representation of the input image based on relevance scores for an object to be localized, comprising:

for each of a plurality of patches of the image, generating a patch-based representation based on low level features extracted from the patch;

with a classifier, outputting a relevance score for each patch, based on the respective patch-based representation; and generating the task-dependent representation based on the patch relevance scores;

thereafter, identifying at least one similar image from a set of images, based on the task-dependent representation of the input image and task-dependent representations of images in the set of images; and identifying a location of the object in the input image based on an object location annotation for at least one of the at least one similar images identified in the set of images, wherein at least one of the generating of the task-dependent representation, identifying of the at least one similar image, and the identifying a location of the object in the input image is performed with a computer processor.

2. The method of claim 1, wherein the generating of the task-dependent representation further comprises:

generating a probability map for the input image based on the patch relevance scores.

3. The method of claim 2, wherein the task-dependent representation comprises a vectorial representation of the probability map.

4. The method of claim 1, wherein at least some of the plurality of patches are overlapping.

5. The method of claim 1, wherein the patch-based representations are each derived from low level features of the respective patch selected from color and gradient features.

6. The method of claim 1, wherein the patch-based representations are output by a generative model built from low level features.

7. The method of claim 6, wherein the patch-based representations comprise Fisher vectors.

8. The method of claim 2, wherein the generating of the task-dependent representation comprises generating a global representation of the image with a generative model based on representations of sub-regions of the image where the contribution of each the sub-regions to the global representation is weighted by the value of the probability map in the sub-region location.

9. The method of claim 1, wherein the identifying of the at least one similar image from the set of images comprises identifying a plurality of similar images and the identifying of the location of the object in the input image is based on object location annotations for the plurality of similar images.

10. The method of claim 1, wherein the identifying of the at least one similar image from the set of images comprises computing a linear kernel between the task-dependent representation of the input image and each of the task-dependent representations of a plurality of the images in the set of images.

11. The method of claim 1, wherein the identifying of the at least one similar image from the set of images comprises computing a similarity between the task-dependent representation of the input image and each of the task-dependent representations of a plurality of the images in the set of images wherein in computing the similarity, the task-dependent representations are embedded with a metric that has been learned on a training set of annotated images and their task-dependent representations.

12. The method of claim 1, wherein the set of images comprises a first set of images and a second set of images and the identifying a location of the object in the input image comprises:

identifying an approximate location of the object in the input image based on the object location annotation for at least one of the at least one similar images identified in the first set of images;

based on the approximate location, identifying a cropped region of the input image;

identifying at least one similar image from the second set of images, based on a task-dependent representation of the cropped region of the input image and task-dependent representations of the images in the second set of images; and identifying a location of the object in the input image based on an object location annotation for at least one of the at least one similar images identified in the second set of images.

13. The method of claim 1, wherein the object to be located comprises a license plate.

14. The method of claim 1, further comprising extracting information from the image in the identified location.

15. The method of claim 1 further comprising training the classifier on patch-based representations of patches extracted from a set of training images, the patches of the training images being labeled with a label representing the overlap between the patch and a location of an object of in the training image which is in the object class.

16. The method of claim 1, wherein the object to be localized comprises a plurality of objects, each object being in a different object class, and the generating of the task-dependent representation of the input image comprises generating a first task-dependent representation of the input image based on relevance scores for the first class of object at locations in the input image output by a first classifier for the first class of object and generating a second task-dependent representation of the input image based on relevance scores for the second class of object at locations in the input image output by a second classifier for the second class of object.

17. The method of claim 1, further comprising outputting at least one of the location of the object in the input image and information extracted from the image in the object location.

18. A computer program product comprising a non-transitory recording medium storing instructions, which when executed by a computer, perform the method of claim 1.

19. A system comprising memory which stores instructions for performing the method of claim 1 and a processor in communication with the memory for executing the instructions.

20. A system for object localization in images comprising:

a patch representation generator which generates patch-based representations of a plurality of patches of an input image;

a classifier component which classifies each of the patches with a trained classifier model based on the respective patch-based representation;

a signature generator which generates a task-dependent representation of the input image based on the classifications of the patches;

a retrieval component configured for retrieving at least one similar image from a set of images, based on a comparison measure between the task-dependent representation of the input image and task-dependent representations of images in the set of images, the task dependent representations having each been generated by classifying patch-based representations of a plurality of patches of a respective one of the images in the set of images with the trained classifier model and generating the task-dependent representation of the image based on the classifications of the patches;

a segmentation component which segments the input image based on a location of an object in the at least one similar image and identifying a location of an object in the input image based on the segmentation; and a processor which implements the patch representation generator, classifier component, signature generator, and segmentation component.

21. The system of claim 20, further comprising an information extraction component for extracting information from the identified location.

22. The system of claim 20, wherein the classifier model is trained on patches extracted from images of vehicles in which a license plate is localized and the object to be localized in the input image is a license plate.

23. The system of claim 20, wherein the classifier component classifies patches of images in the set of images with the trained classifier model based on respective patch-based representations of the patches of the images in the set of images and the signature generator generates a task-dependent representation of each of the images in the set of images based on the classifications of the patches of the respective image.

24. A method for object localization in an image comprising:

with a processor:

for each of a set of test images, generating a patch-based representation of a plurality of patches of the test image with a generative model;

classifying each of the test image patches with a trained classifier model based on the respective patch-based representation;

generating a task-dependent representation of each of the test images based on the classifications of the patches of the test image;

generating patch-based representations of a plurality of patches of an input image with the generative model;

classifying each of the patches of the input image with the trained classifier model based on the respective patch-based representation;

generating a task-dependent representation of the input image based on the classifications of the patches of the input image;

retrieving at least one similar test image from the set of test images, based on a comparison measure between the task-dependent representation of the input image and the task-dependent representations of the test images in the set of test images; and segmenting the input image based on a location of an object in the at least one similar test image and identifying a location of an object in the input image based on the segmentation.

* * * * *